(12) United States Patent
Ausen et al.

(10) Patent No.: US 12,023,841 B2
(45) Date of Patent: Jul. 2, 2024

(54) COEXTRUDED POLYMERIC ARTICLE AND METHOD OF MAKING THE SAME

(71) Applicant: 3M INNOVATIVE PROPERTIES COMPANY, St. Paul, MN (US)

(72) Inventors: Ronald W. Ausen, St. Paul, MN (US); Thomas P. Hanschen, Mendota Heights, MN (US); William J. Kopecky, Hudson, WI (US); Vasav Sahni, St. Paul, MN (US); Ramasubramani Kuduva Raman Thanumoorthy, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 897 days.

(21) Appl. No.: 16/970,531

(22) PCT Filed: Feb. 25, 2019

(86) PCT No.: PCT/IB2019/051506
§ 371 (c)(1),
(2) Date: Aug. 17, 2020

(87) PCT Pub. No.: WO2019/166936
PCT Pub. Date: Sep. 6, 2019

(65) Prior Publication Data
US 2020/0406524 A1    Dec. 31, 2020

Related U.S. Application Data

(60) Provisional application No. 62/636,318, filed on Feb. 28, 2018.

(51) Int. Cl.
*B32B 3/08*    (2006.01)
*B29C 48/08*    (2019.01)
(Continued)

(52) U.S. Cl.
CPC .............. *B29C 48/20* (2019.02); *B29C 48/08* (2019.02); *B29C 48/12* (2019.02); *B29C 48/19* (2019.02);
(Continued)

(58) Field of Classification Search
CPC ...................................................... B29C 48/20
See application file for complete search history.

(56) References Cited

U.S. PATENT DOCUMENTS 4,083,914 A    4/1978 Schippers
4,894,060 A    1/1990 Nestegard
(Continued)

FOREIGN PATENT DOCUMENTS

EP    0343896    11/1989
EP    1918026    5/2008
(Continued)

OTHER PUBLICATIONS

International Search Report for PCT International Application No. PCT/IB2019/051506, mailed on Jun. 19, 2019, 5 pages.

*Primary Examiner* — William P Watkins, III
(74) *Attorney, Agent, or Firm* — Thomas M. Spielbauer

(57) ABSTRACT

Coextruded polymeric article comprising first segments each having first and second opposed major surfaces and a thickness, the first segments comprising first material; second segments comprising second material, wherein adjacent first segments are joined together via a second segment, wherein the second segments extend from the second major surface past the first major surface of each first adjacent segment and has a distal end, the second segments having first and second oppose sides; first protrusions each extending from the first side of a second segment and extending no more than to the first major surface of the respective first segment adjacent to the second segment, the first protrusions
(Continued)

comprising third material; and second protrusions each extending from the first side of a second segment, contacting the first protrusion extending from the second segment and extending not more than to the distal end of the second segment, the second protrusions comprising fourth material, wherein at least one of the second and third or second and fourth materials are different, and wherein the first segments, second segments, first protrusions, and second protrusions each extend continuously for at least 5 mm. Uses for coextruded polymeric articles described herein include adhesive articles and household cleaning products (e.g., a mop, a duster, a brush, a cleaning cloth, or a lint roller).

16 Claims, 10 Drawing Sheets

(51) Int. Cl.
  *B29C 48/12* (2019.01)
  *B29C 48/19* (2019.01)
  *B29C 48/20* (2019.01)
  *B29C 48/21* (2019.01)
  *B29C 48/305* (2019.01)
  *B29C 48/88* (2019.01)
  *B29K 23/00* (2006.01)
  *B29K 33/04* (2006.01)
  *B29K 105/00* (2006.01)
  *B29L 7/00* (2006.01)
  *B29L 9/00* (2006.01)

(52) U.S. Cl.
  CPC ............ *B29C 48/21* (2019.02); *B29C 48/307* (2019.02); *B29C 48/914* (2019.02); *B29K 2023/08* (2013.01); *B29K 2033/04* (2013.01); *B29K 2105/0085* (2013.01); *B29K 2105/0097* (2013.01); *B29L 2007/007* (2013.01); *B29L 2009/00* (2013.01)

(56) References Cited

U.S. PATENT DOCUMENTS

| | | | |
|---|---|---|---|
| 5,080,957 A | 1/1992 | Leseman |
| 5,112,882 A | 5/1992 | Babu |
| 5,145,544 A | 9/1992 | Leseman |
| 5,194,299 A | 3/1993 | Fry |
| 5,209,971 A | 5/1993 | Babu |
| 5,268,228 A | 12/1993 | Orr |
| 5,354,591 A | 10/1994 | Ott |
| 5,405,675 A | 4/1995 | Sawka |
| 5,407,970 A | 4/1995 | Peterson |
| 5,644,007 A | 7/1997 | Davidson |
| 5,650,215 A | 7/1997 | Mazurek |
| 5,681,302 A | 10/1997 | Melbye |
| 5,699,593 A | 12/1997 | Jackson |
| 5,830,298 A | 11/1998 | Jackson |
| 6,106,922 A | 8/2000 | Cejka |
| 6,123,890 A | 9/2000 | Mazurek |
| 6,197,397 B1 | 3/2001 | Sher |
| 6,206,885 B1 | 3/2001 | Ghahremani |
| 6,315,851 B1 | 11/2001 | Mazurek |
| 6,436,218 B2 | 8/2002 | Sher |
| 6,489,003 B1 | 12/2002 | Levitt |
| 6,524,675 B1 | 2/2003 | Mikami |
| 6,531,206 B2 | 3/2003 | Johnston |
| 6,656,567 B1 | 12/2003 | Abe |
| 6,739,599 B1 | 5/2004 | Uchimura |
| 6,814,912 B2 | 11/2004 | Ausen |
| 6,982,055 B2 | 1/2006 | Seth |
| 7,007,351 B2 | 3/2006 | Ausen |
| 7,052,636 B2 | 5/2006 | Ausen |
| 7,182,992 B2 | 2/2007 | Ausen |
| 7,185,401 B2 | 3/2007 | Ausen |
| 7,467,873 B2 | 12/2008 | Clarke |
| 7,622,180 B2 | 11/2009 | Seth |
| 7,678,316 B2 | 3/2010 | Ausen |
| 7,765,651 B2 | 8/2010 | Seth |
| 7,797,081 B2 | 9/2010 | DeMarco |
| 7,897,081 B2 | 3/2011 | Ausen |
| 7,968,172 B2 | 6/2011 | Ausen |
| 9,724,865 B2 | 8/2017 | Ausen |
| 2003/0015819 A1 | 1/2003 | Levitt |
| 2003/0087059 A1 | 5/2003 | Jackson |
| 2003/0124293 A1 | 7/2003 | Sher |
| 2003/0145440 A1 | 8/2003 | Ausen |
| 2003/0178124 A1 | 9/2003 | Mikami |
| 2003/0182776 A1 | 10/2003 | Ausen |
| 2003/0211281 A1 | 11/2003 | Franke |
| 2005/0101926 A1 | 5/2005 | Ausen |
| 2005/0127541 A1 | 6/2005 | Spurgeon |
| 2006/0113699 A1 | 6/2006 | Ausen |
| 2006/0188704 A1 | 8/2006 | Mikami |
| 2007/0110953 A1 | 5/2007 | Ausen |
| 2007/0154683 A1 | 7/2007 | Ausen |
| 2007/0294866 A1* | 12/2007 | Anzini ............... A44B 19/16 24/399 |
| 2008/0078500 A1 | 4/2008 | Sher |
| 2008/0099951 A1 | 5/2008 | Batch |
| 2008/0105356 A1 | 5/2008 | Mikami |
| 2010/0025881 A1 | 2/2010 | Seth |
| 2011/0268906 A1 | 11/2011 | Ausen |
| 2012/0052245 A1 | 3/2012 | Hoium |
| 2012/0098156 A1 | 4/2012 | Ausen |
| 2012/0308755 A1 | 12/2012 | Gorman |
| 2014/0220328 A1 | 8/2014 | Ausen |
| 2017/0008242 A1 | 1/2017 | Legatt |
| 2017/0065923 A1 | 3/2017 | Fox |
| 2017/0066210 A1 | 3/2017 | Wood |
| 2017/0305055 A1 | 10/2017 | Ausen |

FOREIGN PATENT DOCUMENTS

| | | |
|---|---|---|
| GB | 2495629 | 4/2013 |
| JP | 57163546 | 10/1982 |
| WO | WO 1992-001401 | 2/1992 |
| WO | WO 1995-016754 | 6/1995 |
| WO | WO 1999-017631 | 4/1999 |
| WO | WO 2003-059108 | 7/2003 |
| WO | WO 2004-093591 | 11/2004 |
| WO | WO 2010-099148 | 9/2010 |
| WO | WO 2011-097436 | 8/2011 |
| WO | WO 2011-119323 | 9/2011 |
| WO | WO 2015-130934 | 9/2015 |
| WO | WO 2016-191650 | 12/2016 |
| WO | WO 2019-142089 | 7/2019 |
| WO | WO2019-166935 | 9/2019 |

* cited by examiner

COEXTRUDED POLYMERIC ARTICLE AND METHOD OF MAKING THE SAME

CROSS REFERENCE TO RELATED APPLICATION

This application claims the benefit of U.S. Provisional Patent Application No. 62/636,318, filed Feb. 28, 2018, the disclosure of which is incorporated by reference herein in its entirety.

BACKGROUND

Coextruded polymeric articles (including layers) having projections are known in the art. For example, it is known to provide a co-extruded, layer structures where the layer is partitioned, not as coextensive layers in the thickness direction, but as stripes or strands along the width dimension of the layer. This has sometimes been called "side-by-side" co-extrusion.

There is a need for films with projections where the projections are different than the film layer. These projections can provide second and third type performance as compared to the base film layer.

There is a desire for additional polymeric articles with projections that offer different configurations and/or properties (e.g., adhesive properties) over conventional articles. Some adhesive systems that switch from a state of relatively low or no adhesion to a state of much higher adhesion upon application of a certain trigger (commonly called "adhesion on demand" systems) are known. Many of these systems use triggers such as solvents, ultra violet light, heat, or magnetic forces, to create tiered adhesive performance once or repetitively. These systems are limited in applications for several reasons. For many of these triggers, the adhesive system must contain specific chemical groups, which restricts usage to applications where those chemical groups can be tolerated. These systems can be used only where a particular trigger is available and can be effectively applied to the adhesive system. Further, some triggers are difficult or inconvenient for consumers to use. Certain triggers, as well as the chemical groups in the adhesive that respond to such triggers, can be cost-prohibitive.

There is a continuing desire for new coextruded polymeric article constructions. Further, there is a need for "adhesion on demand" systems where the trigger is applicable to all adhesive chemistries, the trigger is more broadly or even universally available, the trigger is easy to apply, not only industrially, but by a consumer, and the adhesion-on-demand system is not exceedingly expensive.

SUMMARY

In one aspect, the present disclosure describes a coextruded polymeric article comprising:

first segments each having first and second opposed major surfaces and a thickness, the first segments comprising first material;

second segments comprising second material, wherein adjacent first segments are joined together via a second segment, wherein the second segments extend from the second major surface past the first major surface of each first adjacent segment and has a distal end, the second segments having first and second oppose sides;

first protrusions each extending from the first side of a second segment and extending no more than to the first major surface of the respective first segment adjacent to the second segment, the first protrusions comprising third material; and second protrusions each extending from the first side of a second segment, contacting the first protrusion extending from the second segment and extending not more than to the distal end of the second segment, the second protrusions comprising fourth material, wherein at least one of the second and third or second and fourth materials are different, and wherein the first segments, second segments, first protrusions, and second protrusions each extend continuously for at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m).

In another aspect, the present disclosure describes a method for making the first coextruded polymeric article described herein, the method comprising:

providing an extrusion die comprising a plurality of shims positioned adjacent to one another, the shims together defining a first cavity, a second cavity, a third cavity, a fourth cavity, and a die slot, wherein the die slot has a distal opening, wherein the die slot is comprised of a first plurality of orifices, a second plurality of orifices, a third plurality of orifices, and a fourth plurality of orifices, wherein the plurality of shims comprises a first plurality of a repeating sequence of shims that together provide a fluid passageway between the first cavity and a first orifice, a second plurality of a repeating sequence of shims that together provide a fluid passageway between the second cavity and a second orifice, a third plurality of a repeating sequence of shims that together provide a fluid passageway between the first cavity and a first orifice and also together provide a fluid passageway between the third cavity and a third orifice, and also together provide a fluid passageway between the fourth cavity and a fourth orifice;

providing via extrusion a first material to the first cavity of the extrusion die, a second material to the second cavity of the extrusion die, a third material to the third cavity of the extrusion die, and a fourth material to fourth cavity of the die, wherein the second and third or second and fourth materials are different;

extruding a layer from the distal opening of the die slot; and quenching the extruded layer.

Embodiments of coextruded polymeric articles described herein can include adhesive articles, household cleaning products (e.g., a mop, a duster, a brush, a cleaning cloth, or a lint roller), and wall attachments.

Embodiments of coextruded polymeric articles described herein can provide a tiered performance, such that for some property of merit (e.g., an adhesive level), the coextruded polymeric article exhibits one level of or value for that property in a base condition or state of use, and at least one different level of or value for that property when in at least one triggered condition or state of use.

DETAILED DESCRIPTION

Figure 1:
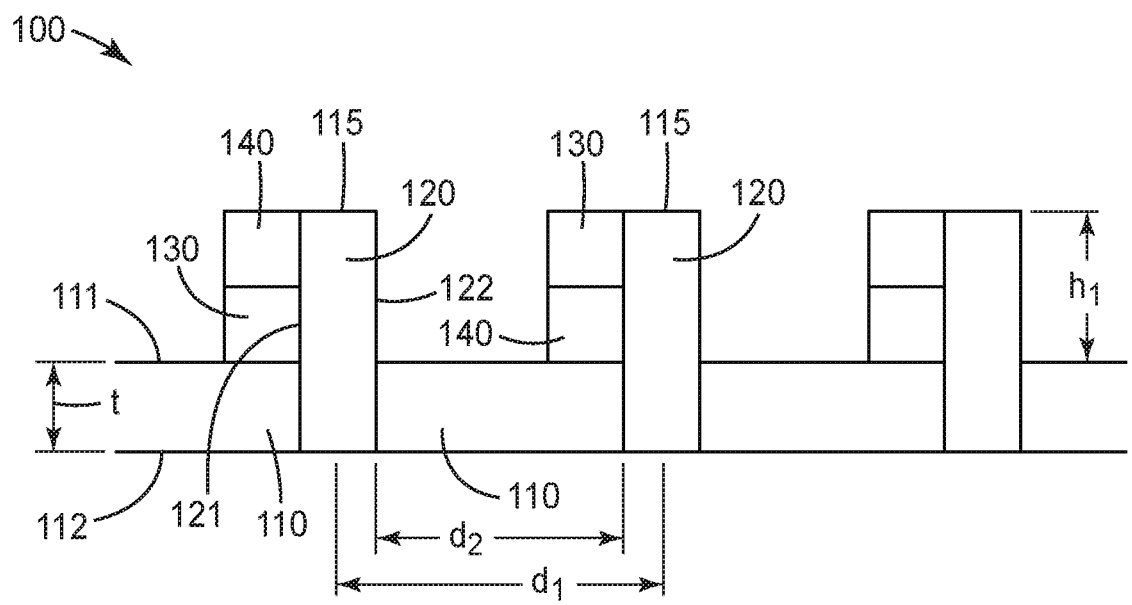
FIG. 1 is a schematic cross-sectional view of an exemplary coextruded polymeric article described herein.

Referring to FIG. 1, exemplary coextruded polymeric article 100 comprises first segments 110 each having first and second opposed major surfaces 111, 112 and thickness t. First segments 110 comprising first material. Second segments 120 comprises second material. Adjacent first segments 110 are joined together via second segment 120. Second segments 120 extend from second major surface 112 past first major surface 111 of each first adjacent segment 110 and has distal end 115. Second segments 120 have first and second oppose sides 121, 122. First protrusions 130 each extend from first side 121 of second segment 120 and extend no more than to first major surface 111 of the respective first segment 110 adjacent to second segment 120. First protrusions 130 comprise third material. Second protrusions 140 each extend from first side 121 of a second segment 120 contacting first protrusion 130 extending from second segment 120 and extending not more than to distal end 115 of second segment 120. Second protrusions 140 comprise fourth material. At least one of second and third or second and fourth materials are different. First segments 111, second segments 120, first protrusions 130, and second protrusions 140 each extend continuously for at least 5 mm. Height, $h_1$, of second segment 120 is not greater than 2 mm. There are at least 2.5 second segments per centimeter. Distance, $d_1$, measured from the respective midpoints of two second segments, is used to express the number of projections in a given distance. Distance, $d_2$, which is measured from the closest sides of two second segments, is used to express the distance between second segments.

In some embodiments of the first coextruded polymeric article, at least one of the first, second, or third materials independently comprise at least one of a thermoplastic resin (e.g., at least one of, including copolymers and blends thereof, a polyolefin (e.g., polypropylene and polyethylene), polyvinyl chloride, a polystyrene, nylon, a polyester (e.g., polyethylene terephthalate) or an elastomer (e.g., an ABA block copolymer, a polyurethane, a polyolefin elastomer, a polyurethane elastomer, a metallocene polyolefin elastomer, a polyamide elastomer, an ethylene vinyl acetate elastomer, and a polyester elastomer)). In some embodiments, at least one of the third or fourth material is adhesive. In some embodiments, at least one of the first, third or fourth materials is adhesive. Exemplary adhesives include at least one of, including copolymers and blends thereof, an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

In some embodiments, at least two of the first, second, third, or fourth materials are the same material. In some embodiments, at least two of the first, second, third, or fourth materials are different materials. "Different" as used herein means at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. Examples of differences in polymeric materials that can provide the difference between polymeric materials include composition, microstructure, color, and refractive index. The term "same" in terms of polymeric materials means not different.

In some embodiments, there is at least one of a demarcation line between at least one of first and second protrusions, second segments and first protrusions, second segments and second protrusions, or first and second segments. These constructions can be formed by methods described herein where materials are coextruded in a manner that results in a distinct line of orientation visible at the polymer boundary between connected segments and protrusions. This demarcation line or boundary region between connected segments and protrusions can be detected using Differential Scanning Calorimetry. Comparing by temperature modulated differential scanning calorimetry a region containing mostly a demarcation line (Region 1) versus a region that does not substantially contain material from the demarcation line (Region 2) a difference in heat flow/heat capacity is observed that is believed to be consistent with an energy release or reduction in molecular orientation/internal stress. That is, although not wanting to be bound by theory, it is believed that the thermal signatures of the regions may be a combination of material thermal transitions and the material response to retained thermal/processing history.

In another aspect, the present disclosure describes a method for making the coextruded polymeric article described herein, the method comprising:

providing an extrusion die comprising a plurality of shims positioned adjacent to one another, the shims together defining a first cavity, a second cavity, a third cavity, a fourth cavity, and a die slot, wherein the die slot has a distal opening, wherein the die slot is comprised of a first plurality of orifices, a second plurality of orifices, a third plurality of orifices, and a fourth plurality of orifices, wherein the plurality of shims comprises a first plurality of a repeating sequence of shims that together provide a fluid passageway between the first cavity and a first orifice, a second plurality of a repeating sequence of shims that together provide a fluid passageway between the second cavity and a second orifice, a third plurality of a repeating sequence of shims that together provide a fluid passageway between the first cavity and a first orifice and also together provide a fluid passageway between the third cavity and a third orifice and also together provide a fluid passageway between the fourth cavity and a fourth orifice;

providing via extrusion a first material to the first cavity of the extrusion die, a second material to the second cavity of the extrusion die, a third material to the third cavity of the extrusion die, and a fourth material to fourth cavity of the die, wherein the second and third or second and fourth materials are different;

extruding a layer from the distal opening of the die slot; and quenching the extruded layer.

Coextruded polymeric articles described herein (including that shown in FIG. 1), each of the segments and protrusions may be considered monolithic (i.e., having a generally uniform composition) and are not fibrous. The first protrusion can extend to, and can be bonded to, but does not pass into the first segment. This is accomplished by formation of weld lines, called demarcation lines at the die region where the dispensing orifices merge together at the distal opening. Further, the segments and protrusions are not nonwoven materials, nor are they coated or added via as a secondary step. In some embodiments described below, however, portions of the articles may be apertured. Typically, the segments and protrusions are co-extruded and melt bonded together to form coextruded, continuous, polymeric articles. Referring again to FIG. 1, coextruded polymeric article 100 can be prepared, for example, by extrusion from a die having a variety of passageways from cavities within the die to a dispensing slot, including exemplary dies described herein (see, e.g., FIGS. 2 and 9). The die may conveniently be comprised of a plurality of shims. In some embodiments a first plurality of a repeating sequence of shims that together provide a fluid passageway between the first cavity and a first orifice, a second plurality of a repeating sequence of shims that together provide a fluid passageway between the second cavity and a second orifice, a third plurality of a repeating sequence of shims that together provide a fluid passageway between the first cavity and a first orifice and also together provide a fluid passageway between the third cavity and a third orifice and also together provide a fluid passageway between the fourth cavity and a fourth orifice.

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used. The shape of the passageways within, for example, a sequence of shims, may be identical or different. Examples of passageway cross-sectional shapes include round, square, and rectangular shapes. In some embodiments, the shims that provide a passageway between one cavity and the dispensing slot might have a flow restriction compared to the shims that provide a passageway between another cavity and the dispensing slot. The width of the distal opening within, for example, a different sequence of shims, may be identical or different. For example, the portion of the distal opening provided by the shims that provide a passageway between one cavity and the dispensing slot could be narrower than the portion of the distal opening provided by the shims that provide a passageway between another cavity and the dispensing slot. In general, the distal opening to create the second segments is much longer than the distal opening to create the first segment.

Individual cavities and passageways provide a conduit for polymer to orifices to create the segments and protrusions. These individual flow streams merge together to form a continuous, solid coextruded polymeric article, at the die slot portion of the die. Spacer shims provide connecting slots to form demarcation lines connecting the protrusions and segments.

In some embodiments, extrusion dies described herein include a pair of end blocks for supporting the plurality of shims. In these embodiments, it may be convenient for one, or even all, of the shims to each have at least one through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or more, of the cavities.

In some embodiments, the shims will be assembled according to a plan that provides a repeating sequence of shims of diverse types. The repeating sequence can have diverse numbers of shims per repeat. For a first example, a repeating sequence comprised of five different shims is described below to create the orifice pattern shown in FIG. 2 to create the coextruded polymeric article shown in FIG. 1. When that five-shim repeating sequence is properly provided with molten polymer, it extrudes a continuous film through the die slot to create the coextruded polymeric article with segments and protrusions.

In some embodiments, the assembled shims (conveniently bolted between the end blocks) further comprise a manifold body for supporting the shims. The manifold body has at least one (e.g., in some embodiments, at least two, three, four, or more) manifold therein, the manifold having an outlet. An expansion seal (e.g., made of copper or alloys thereof) is disposed to seal the manifold body and the shims, such that the expansion seal defines a portion of at least one of the cavities (in some embodiments, a portion of both the first and second cavities), and such that the expansion seal allows a conduit between the manifold and the cavity.

Typically, the passageway between cavity and dispensing orifice is up to 5 mm in length. Sometimes the fluid passageways leading to one array has greater fluid restriction than the fluid passageways leading to one or more of the other arrays.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways, several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

In practicing methods described herein, the polymeric materials might be solidified simply by cooling. This can be conveniently accomplished passively by ambient air, or actively, for example, by quenching the extruded first and second polymeric materials on a chilled surface (e.g., a chilled roll). In some embodiments, any of the first, second, third or fourth polymeric materials are low molecular weight polymers that need to be cross-linked to be solidified, which can be done, for example, by electromagnetic or particle radiation. In some embodiments, it is desirable to maximize the quenching time to increase the bond strength.

Figure 2:
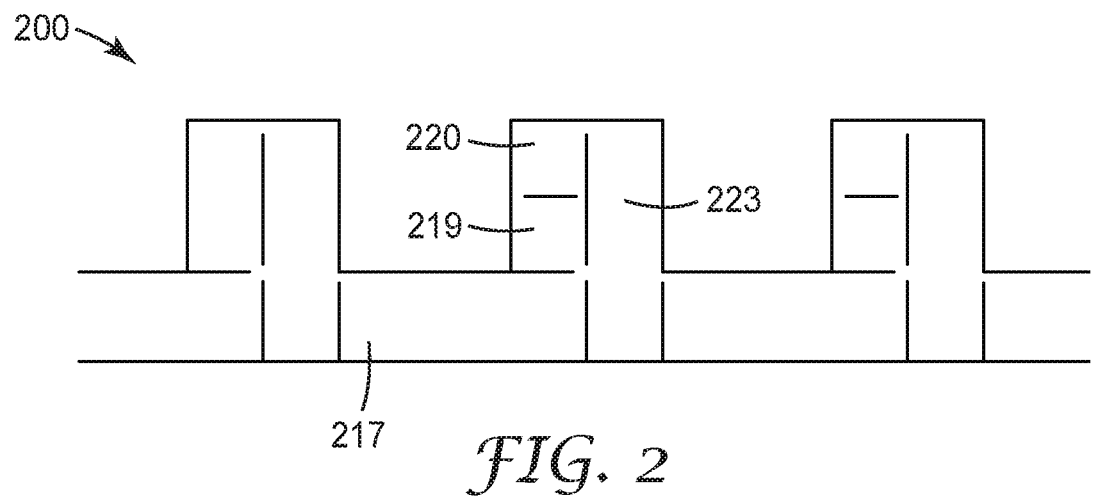
FIG. 2 is a schematic cross-sectional view of an exemplary die cavity pattern just upstream from the dispensing slot of the die employed in the formation of an exemplary coextruded polymeric article described herein.

FIG. 2 is a schematic cross-sectional view of an exemplary die orifice pattern just upstream from the dispensing slot of the die employed in the formation of an exemplary coextruded polymeric article described herein. Orifice plan 200 shows first orifices 217, second orifices 223, third orifices 219, and fourth orifices 220. As will be described in detail later, the orifices are spaced apart to provide passageway sidewalls between passageways. The individual flow-streams are merged together, with demarcation lines to form a continuous coextruded polymeric article in the final slot orifice of the die, not shown. The demarcation lines are created at orifices separated by a minimal amount, by spacer shims. These shims typically have thicknesses in a range from 50 to 200 micrometers. The depth of the final slot is long enough, and the distance between the orifices are close, such that a continuous article, a created sum of all orifices, is formed within the final slot of the die.

Figure 3A:
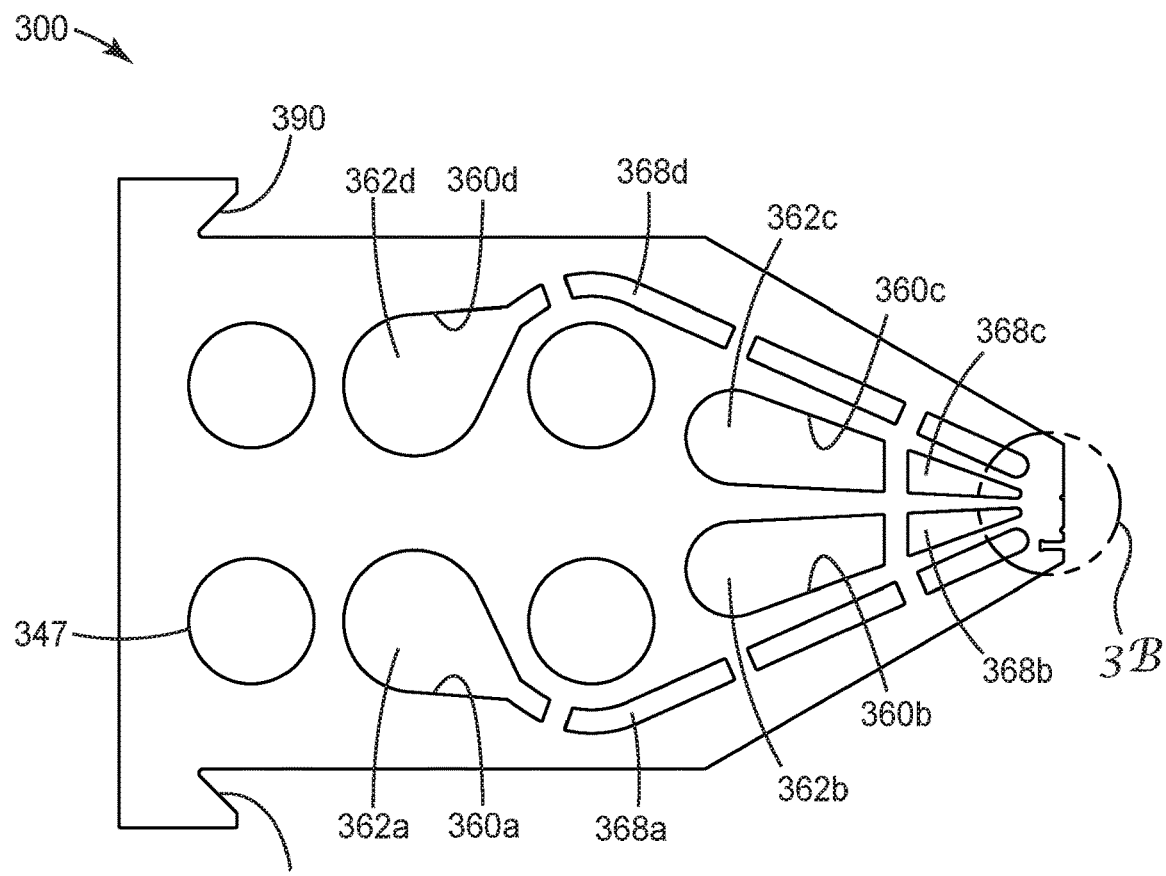
FIG. 3A is a plan view of an exemplary embodiment of a shim suited to form a sequence of shims capable of forming an exemplary coextruded polymeric article, for example, as shown in the schematic cross-sectional views of FIG. 1.
Figure 3B:
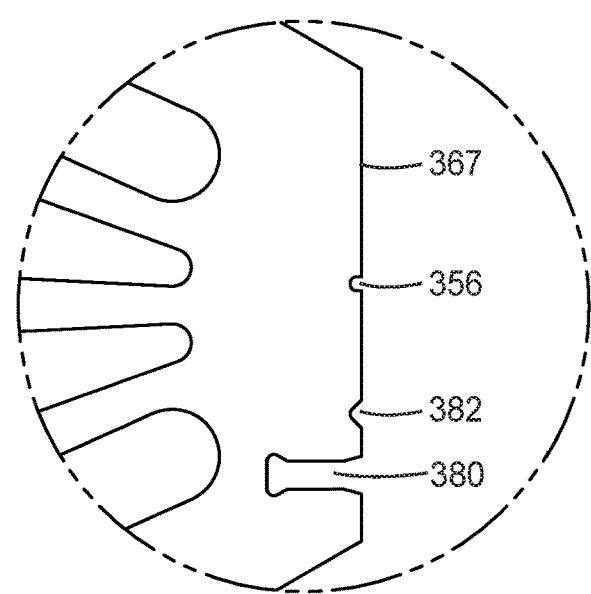
FIG. 3B is an expanded region near the dispensing surface of the shim shown in FIG. 3A.
Figure 8:
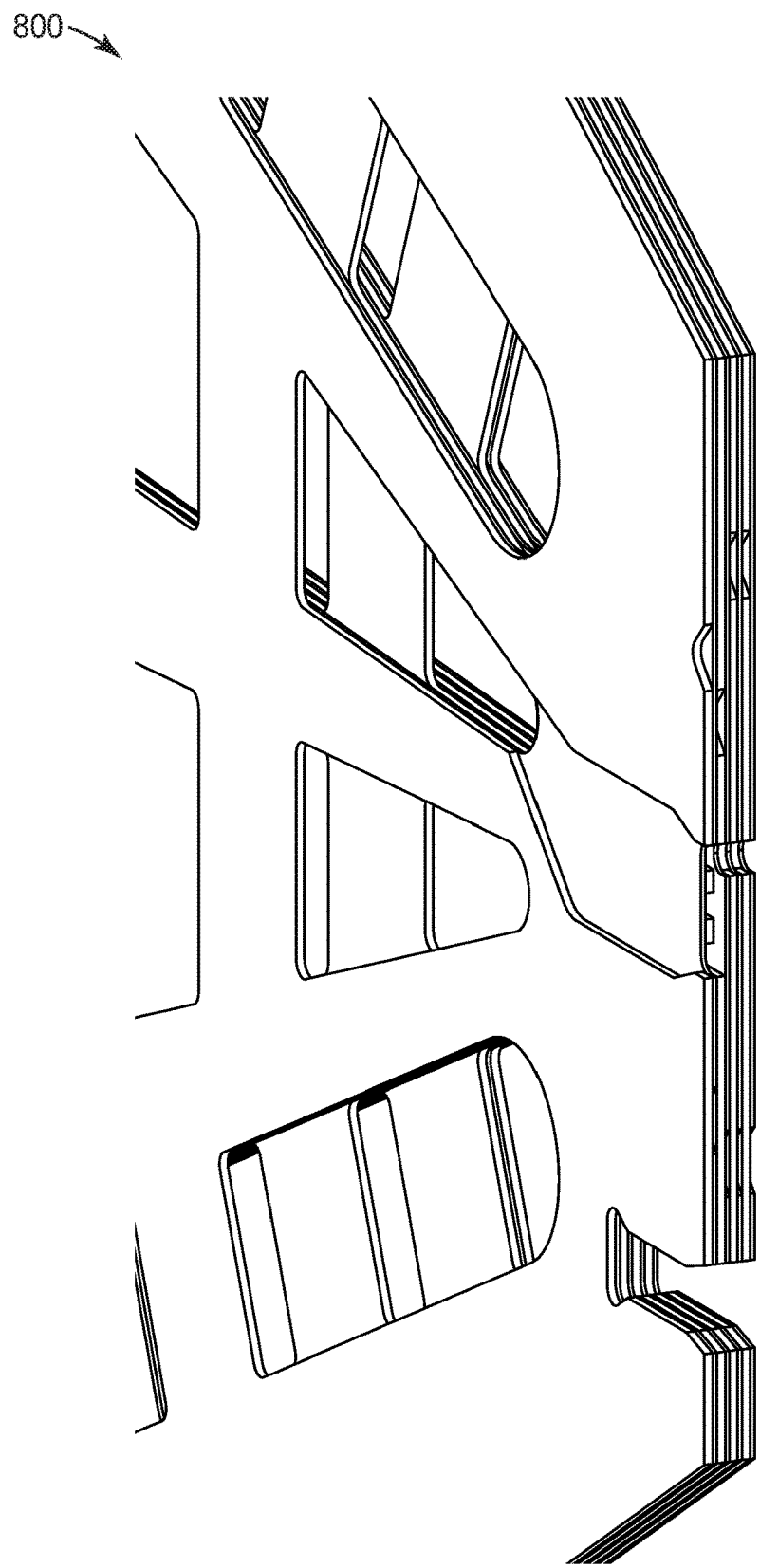
FIG. 8 is a perspective assembly drawing of several different exemplary sequences of shims employing the shims of FIGS. 3A, 4A, 5A, 6A, and 7A for making exemplary coextruded polymeric articles described herein, segments and protrusions in a repeating arrangement as shown in FIG. 1.
Figure 9:
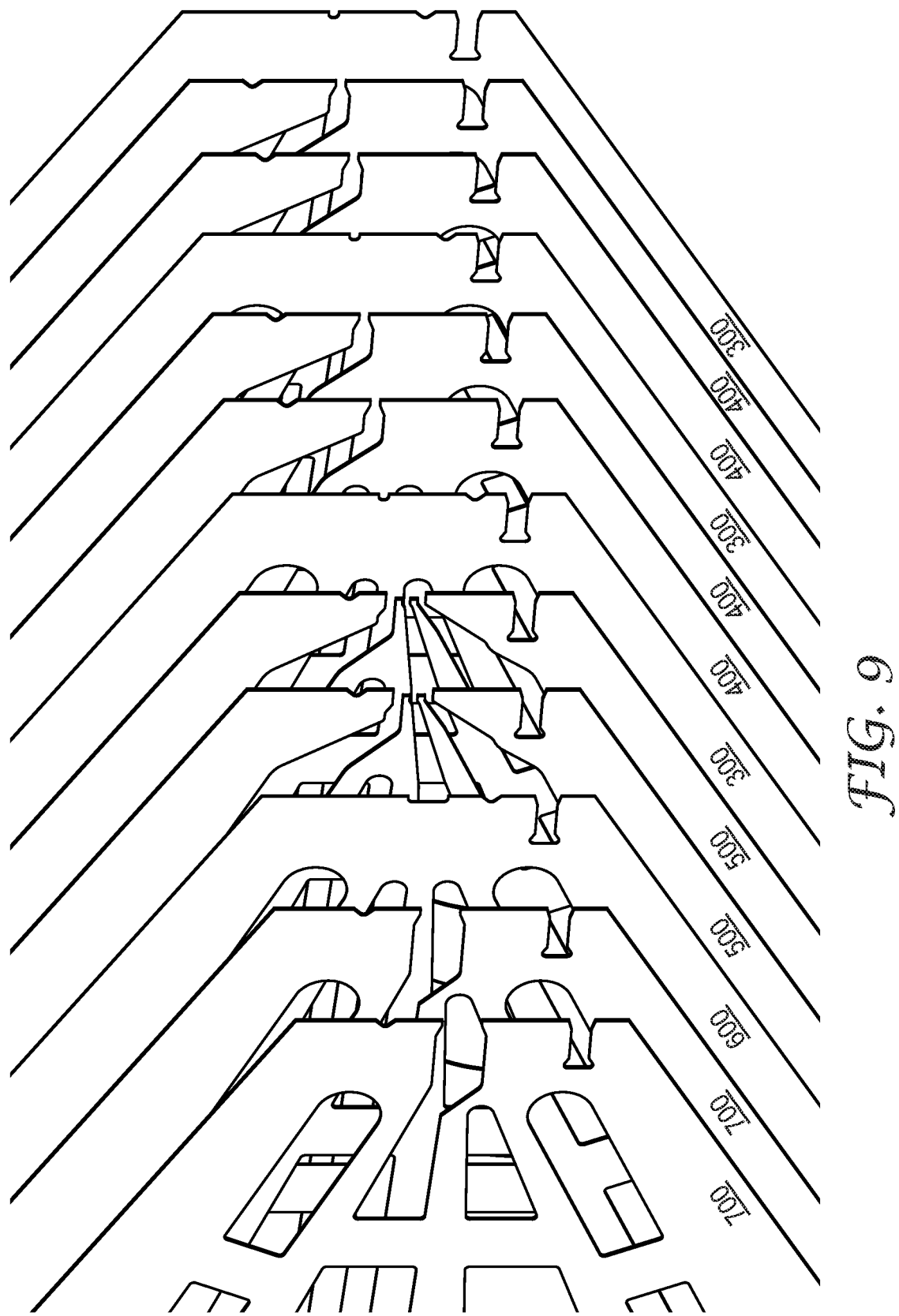
FIG. 9 is a perspective view of the some of the sequence of shims of FIG. 8, further exploded to reveal some individual shims.

Referring now to FIGS. 3A and 3B, a plan view of shim 300 is illustrated. Shim 300 has first aperture 360a, second aperture 360b third aperture 360c, and fourth aperture 360d. When shim 300 is assembled with others as shown in FIGS. 8 and 9, aperture 360a aids in defining first cavity 362a, aperture 360b aids in defining second cavity 362b, aperture 360c aids in defining third cavity 362c, and aperture 360d aids in defining third cavity 362d. Passageways 368a, 368b, 368c, and 368d cooperate with analogous passageways on adjacent shims to allow passage from cavities 362a, 362b, 362c, and 362d to the dispensing surfaces of the appropriate shims when the shims are assembled as shown in FIGS. 8 and 9.

Shim 300 has several holes 347 to allow the passage of, for example, bolts, to hold shim 300 and others to be described below into an assembly. Shim 300 also has dispensing surface 367, and in this embodiment, dispensing surface 367 has indexing groove 380 which can receive an appropriately shaped key to ease assembling diverse shims into a die. The shim may also have identification notch 382 to help verify that the die has been assembled in the desired manner. This embodiment has shoulders 390 and 392 which can assist in mounting the assembled die with a mount of the type shown in FIG. 11. Shim 300 has dispensing opening 356, but it will be noted that this shim has no connection between dispensing opening 356 and any of cavities 362a, 362b, 362c, or 362d. Shim 300 serves as a spacer shim and provides a sidewall for passageways of adjacent shims. Opening 356 provides a continuous dispensing slot for extrusion. This continuous slot enables polymer streams to merge together to form demarcation lines in the coextruded polymeric article between die orifices.

Figure 4A:
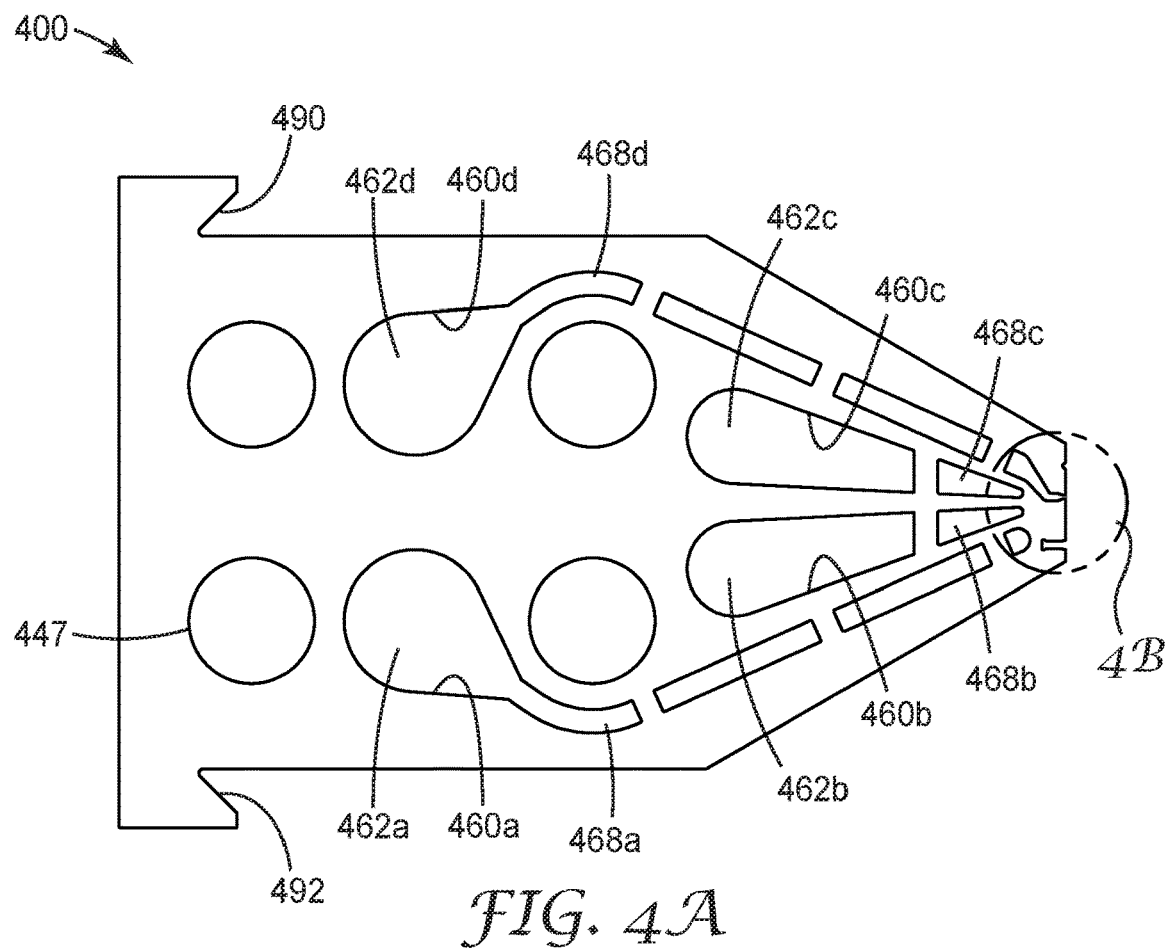
FIG. 4A is a plan view of an exemplary embodiment of a shim suited to form a sequence of shims capable of forming a coextruded polymeric article, for example, as shown in the schematic cross-sectional views of FIG. 1.
Figure 4B:
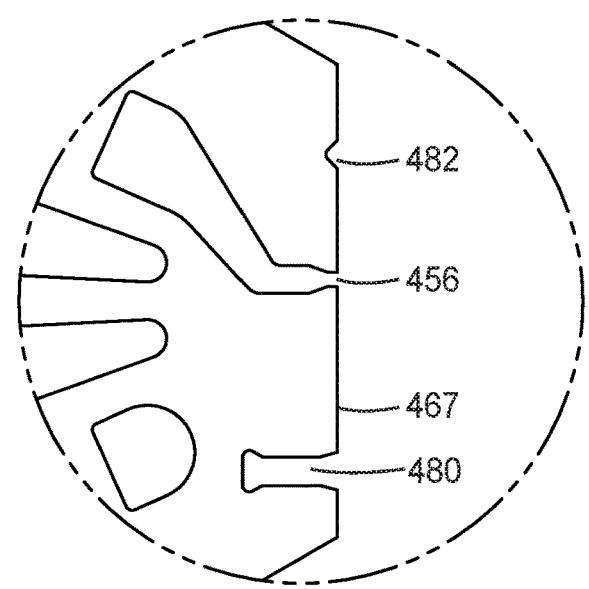
FIG. 4B is an expanded region near the dispensing surface of the shim shown in FIG. 4A.

Referring to FIGS. 4A, and 4B, a plan view of shim 400 is illustrated. Shim 400 has first aperture 460a, second aperture 460b, third aperture 460c, and fourth aperture 460d. When shim 400 is assembled with others as shown in FIGS. 8 and 9, aperture 460a aids in defining first cavity 662a, aperture 660b aids in defining second cavity 662b, aperture 660c aids in defining third cavity 462c, and aperture 460d aids in defining third cavity 462d. Passageways 468a, 468b, 468c, and 468d cooperate with analogous passageways on adjacent shims to allow passage from cavities 462a, 462b, 462c, and 462d to the dispensing surfaces of the appropriate shims when the shims are assembled as shown in FIGS. 8 and 9.

Shim 400 has several holes 447 to allow the passage of, for example, bolts, to hold shim 400 and others to be described below into an assembly. Shim 400 also has dispensing surface 467, and in this embodiment, dispensing surface 467 has indexing groove 480 which can receive an appropriately shaped key to ease assembling diverse shims into a die. The shim may also have identification notch 482 to help verify that the die has been assembled in the desired manner. This embodiment has shoulders 490 and 492 which can assist in mounting the assembled die with a mount of the type shown in FIG. 11. Shim 400 has dispensing opening 456, in dispensing surface 467. Dispensing opening 456 may be more clearly seen in the expanded view shown in FIG. 4B. Dispensing opening 456 has connection to cavity 462d. It might seem that there is no path from cavity 462d to dispensing opening 456, via, for example, passageway 468d, but the flow has a route in the perpendicular-to-the-plane-of-the-drawing dimension when the sequence of FIG. 4 is completely assembled.

Figure 5A:
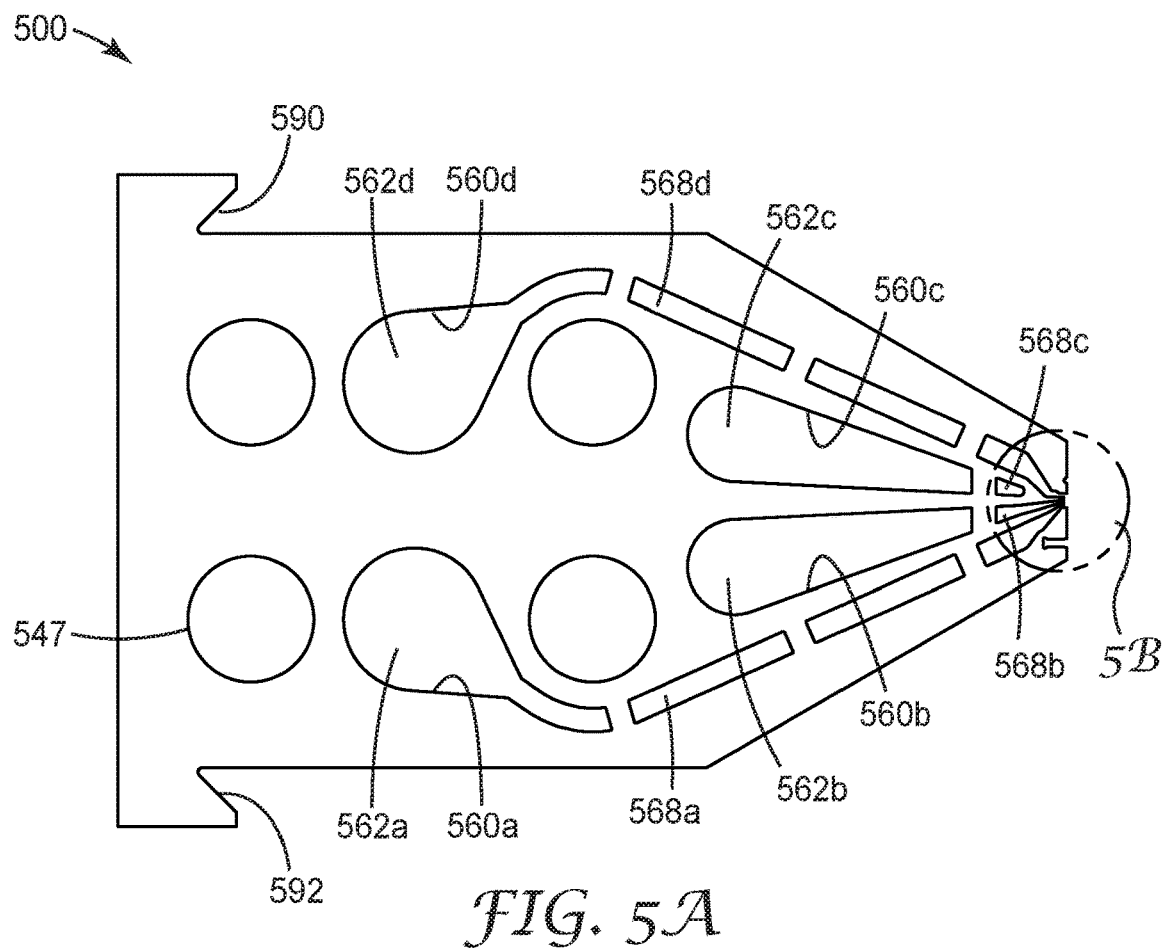
FIG. 5A is a plan view of an exemplary embodiment of a shim suited to form a sequence of shims capable of forming a coextruded polymeric article, for example, as shown in the schematic cross-sectional views of FIG. 1.
Figure 5B:
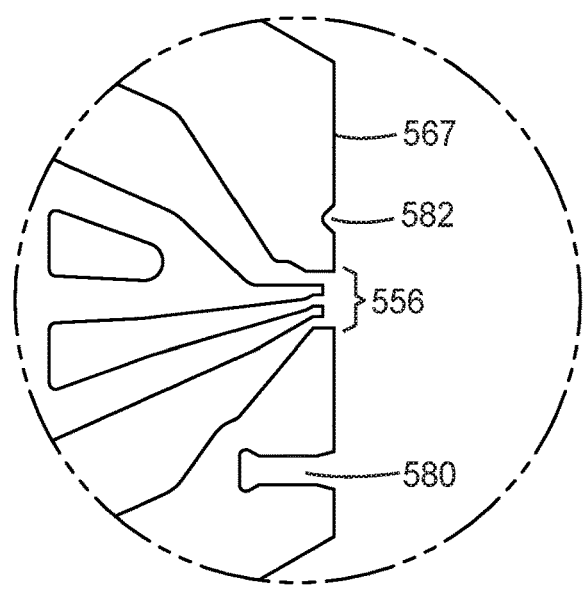
FIG. 5B is an expanded region near the dispensing surface of the shim shown in FIG. 5A.

Referring to FIGS. 5A and 5B, a plan view of shim 500 is illustrated. Shim 500 has first aperture 560a, second aperture 560b, third aperture 560c, and fourth aperture 560d. When shim 500 is assembled with others as shown in FIGS. 8 and 9, aperture 560a aids in defining first cavity 562a, aperture 560b aids in defining second cavity 562b, aperture 560c aids in defining third cavity 562c, and aperture 560d aids in defining third cavity 562d. Passageways 568a, 568b, 568c, and 568d cooperate with analogous passageways on adjacent shims to allow passage from cavities 562a, 562b, 562c, and 562d to the dispensing surfaces of the appropriate shims when the shims are assembled as shown in FIGS. 8 and 9.

Shim 500 has several holes 547 to allow the passage of, for example, bolts, to hold shim 500 and others to be described below into an assembly. Shim 500 also has dispensing surface 567, and in this embodiment, dispensing surface 567 has indexing groove 580 which can receive an appropriately shaped key to ease assembling diverse shims into a die. The shim may also have identification notch 582 to help verify that the die has been assembled in the desired manner. This embodiment has shoulders 590 and 592 which can assist in mounting the assembled die with a mount of the type shown in FIG. 10. Shim 500 has dispensing opening 556, with connection to cavities 562a, and 562b, and 562d. Shim 500 creates a portion of the first segment with connection pathway 568d, and also forms first and second protrusions with connection pathway 568b and 568a. These 3 streams merge together to form demarcation lines in the coextruded polymeric article between die orifices.

Figure 6A:
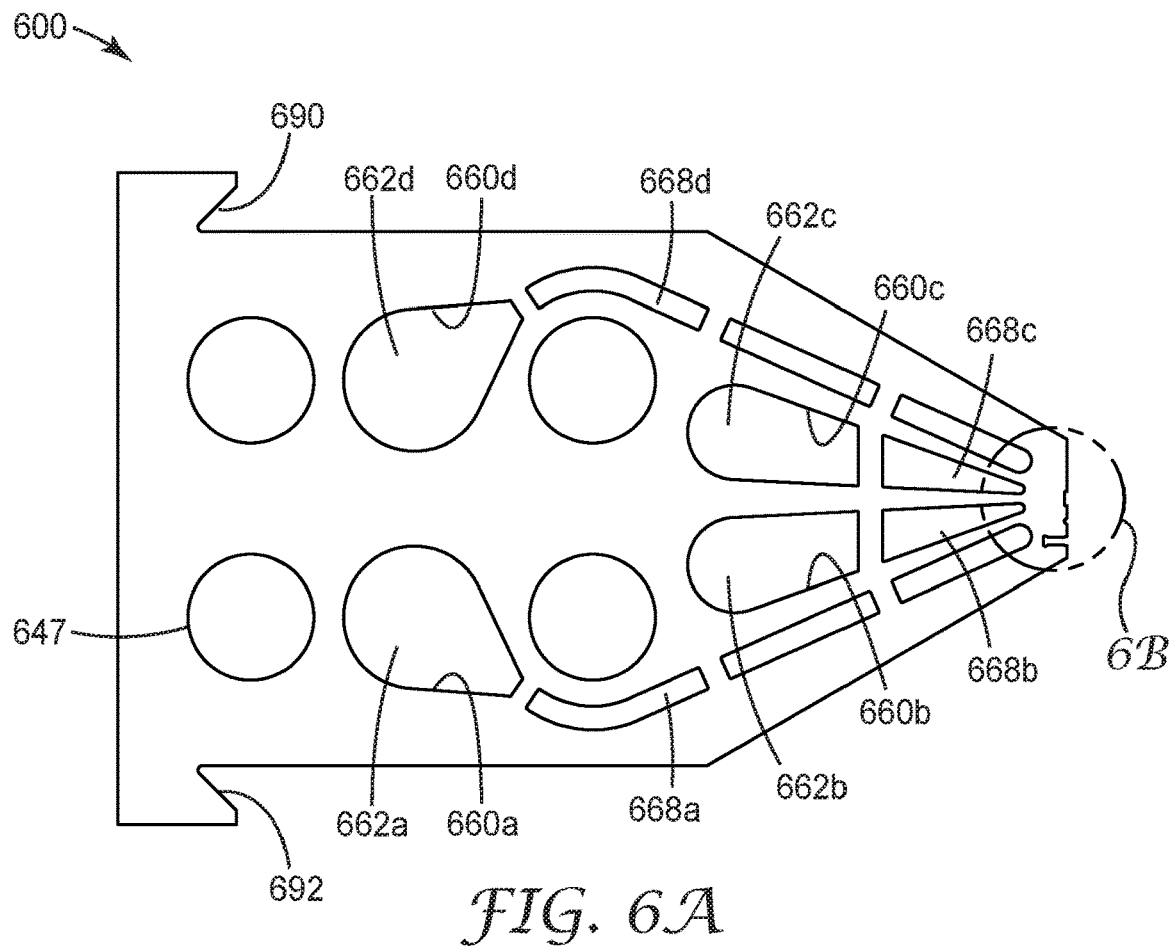
FIG. 6A is a plan view of an exemplary embodiment of a shim suited to form a sequence of shims capable of forming a coextruded polymeric article, for example, as shown in the schematic cross-sectional views of FIG. 1.
Figure 6B:
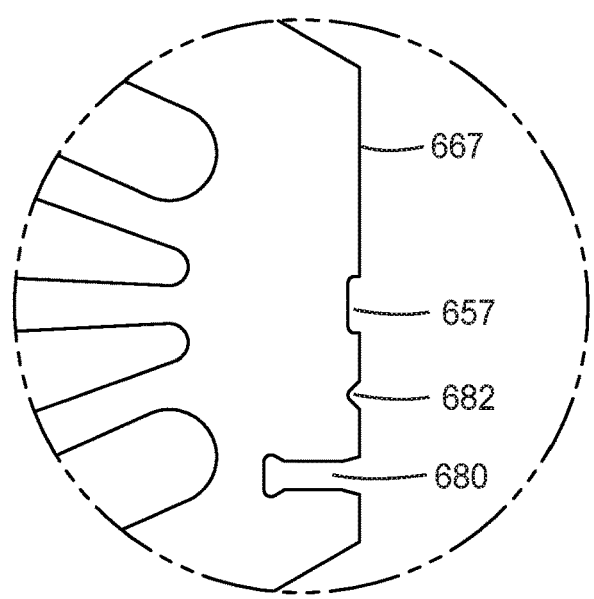
FIG. 6B is an expanded region near the dispensing surface of the shim shown in FIG. 6A.

Referring to FIGS. 6A and 6B, a plan view of shim 600 is illustrated. Shim 600 has first aperture 660a, second aperture 60b, third aperture 660c, and fourth aperture 660d. When shim 600 is assembled with others as shown in FIGS. 8 and 9, aperture 660a aids in defining first cavity 662a, aperture 660b aids in defining second cavity 662b, aperture 660c aids in defining third cavity 662c, and aperture 660d aids in defining third cavity 662d. Passageways 668a, 668b, 668c, and 668d cooperate with analogous passageways on adjacent shims to allow passage from cavities 662a, 662b, 662c, and 662d to the dispensing surfaces of the appropriate shims when the shims are assembled as shown in FIGS. 8 and 9.

Shim 600 has several holes 647 to allow the passage of, for example, bolts, to hold shim 600 and others to be described below into an assembly. Shim 600 also has dispensing surface 667, and in this embodiment, dispensing surface 667 has indexing groove 680 which can receive an appropriately shaped key to ease assembling diverse shims into a die. The shim may also have identification notch 682 to help verify that the die has been assembled in the desired manner. This embodiment has shoulders 690 and 692 which can assist in mounting the assembled die with a mount of the type shown in FIG. 11. Shim 600 has dispensing opening 656, in dispensing surface 667. Shim 600 serves as a spacer shim, there is not a connection between opening 656 and any of the cavities.

Figure 7A:
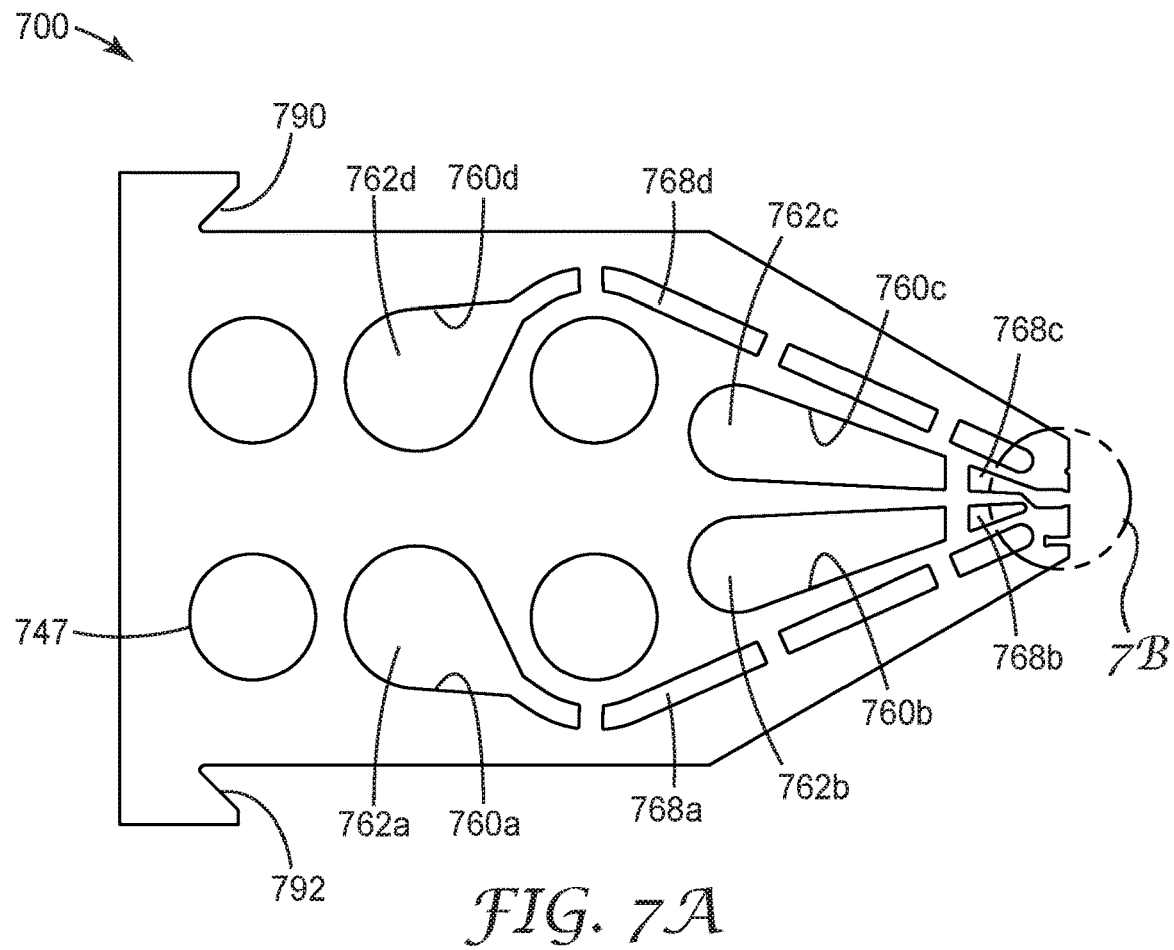
FIG. 7A is a plan view of an exemplary embodiment of a shim suited to form a sequence of shims capable of forming a coextruded polymeric article, for example, as shown in the schematic cross-sectional views of FIG. 1.
Figure 7B:
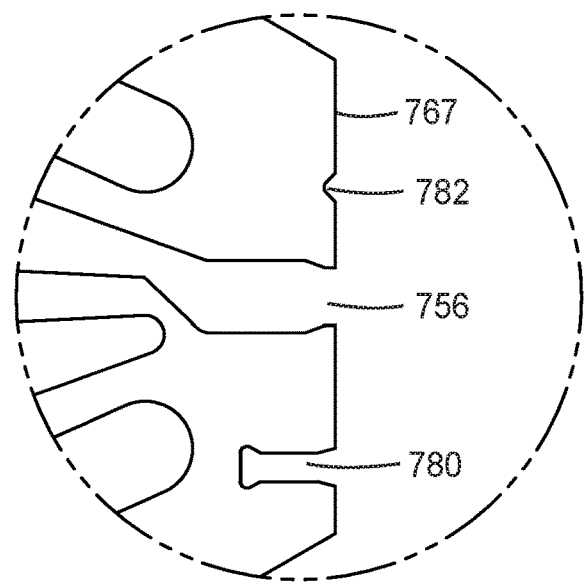
FIG. 7B is an expanded region near the dispensing surface of the shim shown in FIG. 7A.

Referring to FIGS. 7A and 7B, a plan view of shim 700 is illustrated. Shim 700 has first aperture 760a, second aperture 760b, third aperture 760c, and fourth aperture 760d. When shim 700 is assembled with others as shown in FIGS. 8 and 9, aperture 760a aids in defining first cavity 762a, aperture 760b aids in defining second cavity 762b, aperture 760c aids in defining third cavity 762c, and aperture 760d aids in defining third cavity 762d. Passageways 768a, 768b, 768c, and 768d cooperate with analogous passageways on adjacent shims to allow passage from cavities 762a, 762b, 762c, and 762d to the dispensing surfaces of the appropriate shims when the shims are assembled as shown in FIGS. 8 and 9.

Shim 700 has several holes 747 to allow the passage of, for example, bolts, to hold shim 700 and others to be described below into an assembly. Shim 700 also has dispensing surface 767, and in this embodiment, dispensing surface 767 has indexing groove 780 which can receive an appropriately shaped key to ease assembling diverse shims into a die. The shim may also have identification notch 782 to help verify that the die has been assembled in the desired manner. This embodiment has shoulders 790 and 792 which can assist in mounting the assembled die with a mount of the type shown in FIG. 11. Shim 700 has dispensing opening 756, in dispensing surface 767. Dispensing opening 756 may be more clearly seen in the expanded view shown in FIG. 7B. Dispensing opening 756 has connection to cavity 762c. It might seem that there is no path from cavity 762c to dispensing opening 756, via, for example, passageway 768c, but the flow has a route in the perpendicular-to-the-plane-of-the-drawing dimension when the sequence of FIG. 8 is completely assembled.

Referring to FIG. 8, a perspective assembly drawing of a several different repeating sequences of shims, collectively 800, employing the shims of FIGS. 3-7 to produce coextruded polymeric article 100 shown in FIG. 1 is shown. It should be noted in FIG. 8 that the dispensing slot, formed by dispensing openings 356, 456, 556, 656, and 756 collectively in the plurality of shims, is a continuous opening across the die. This continuous opening is fed from the four extrusion orifices as shown in FIG. 2. There are no shims without dispensing openings, which may form breaks to cause the extruded polymeric compositions to form into separated strands.

Referring to FIG. 9, an exploded perspective assembly drawing of a repeating sequence of shims employing the shims of FIGS. 3-9 is illustrated. In the illustrated embodiment, the repeating sequence includes, from bottom to top as the drawing is oriented, one instance of shim 300, two instances of shim 400 which forms the first orifice, one instance of shim 300, two instances of shim 400, one instance of shim 300, two instances of shim 500, one instance of shim 600, and two instances of shim 700. In this view, it can be appreciated how the four orifices are merged together at the extrusion slot to generate a continuous a coextruded polymeric article.

Figure 10:
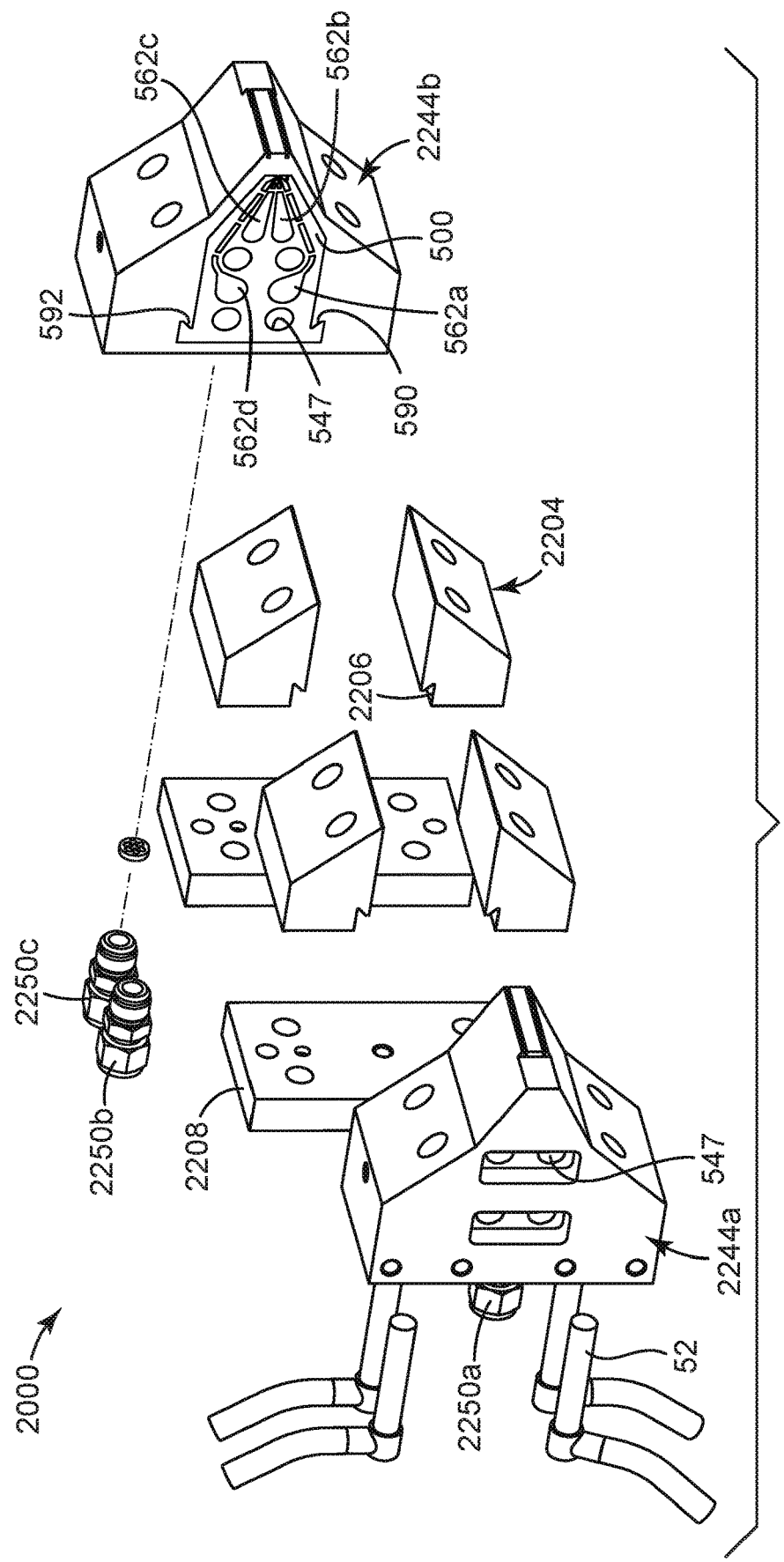
FIG. 10 is an exploded perspective view of an example of a mount suitable for an extrusion die composed of multiple repeats of the sequence of shims of FIGS. 8 and 9.

Referring to FIG. 10, an exploded perspective view of a mount 2000 suitable for an extrusion die composed of multiple repeats of the repeating sequence of shims of FIGS. 8 and 9 is illustrated. Mount 2000 is particularly adapted to use shims 300, 400, 500, 600, and 700 as shown in FIGS. 3-7. For visual clarity, however, only a single instance of shims is shown in FIG. 10. The multiple repeats of the repeating sequence of shims of FIGS. 8 and 9 are compressed between two end blocks 2244a and 2244b. Conveniently, through bolts can be used to assemble the shims to end blocks 2244a and 2244b, passing through holes 547 in shims 500 et al.

In this embodiment, inlet fittings provide a flow path for three streams of molten polymer through end blocks 2244a and 2244b to cavities 562a, 562b, and 562c, and 562d. Compression blocks 2204 have notch 2206 that conveniently engages the shoulders on shims (e.g., 590 and 592) on 500. When mount 2000 is completely assembled, compression blocks 2204 are attached by, for example, machine bolts to backplates 2208. Holes are conveniently provided in the assembly for the insertion of cartridge heaters 52.

Figure 11:
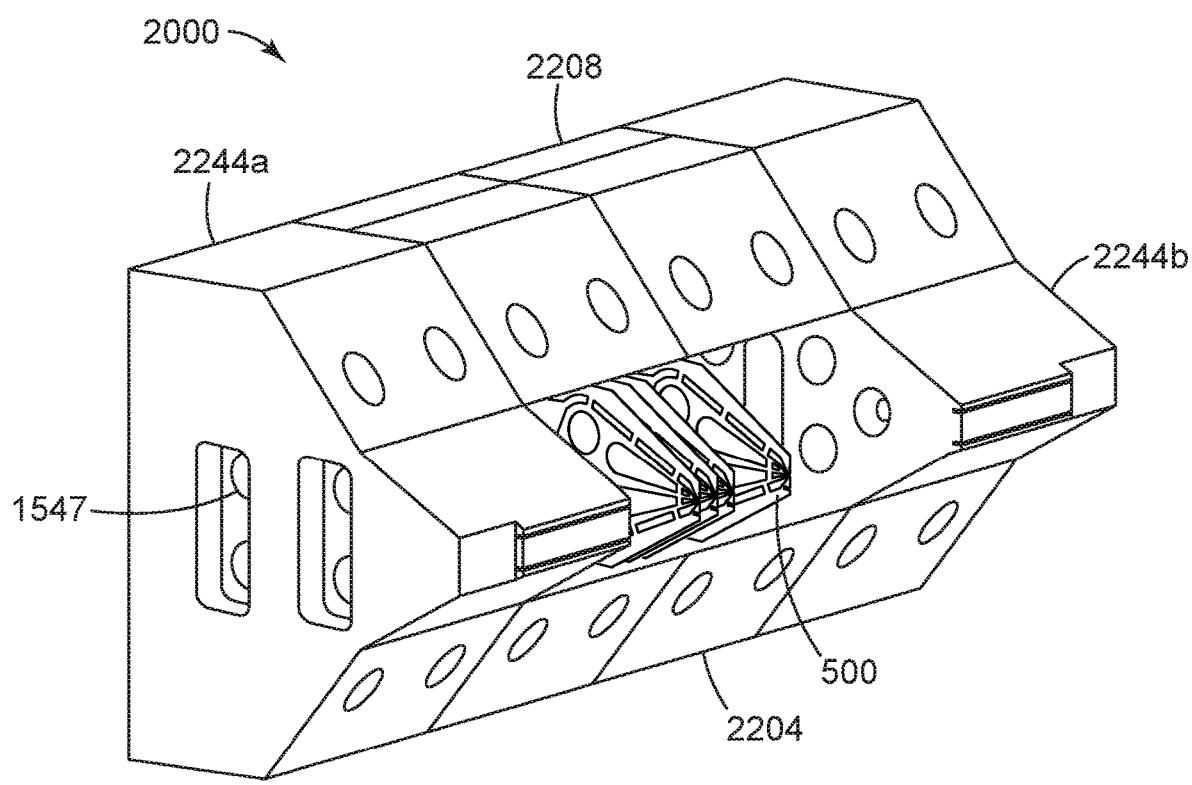
FIG. 11 is a perspective view of the mount of FIG. 10 in an assembled state.

Referring to FIG. 11, a perspective view of the mount 2000 of FIG. 11 is illustrated in a partially assembled state. A few shims, for example, 500 are in their assembled positions to show how they fit within mount 2000, but most of the shims that would make up an assembled die have been omitted for visual clarity.

In some embodiments, the second segments are generally parallel to each other and generally perpendicular to the first major surface of the adjacent first segments.

In some embodiments, at least one of the second segments, the first protrusions, or the second protrusions have an aspect ratio (i.e., height to thickness) of at least 2:1 (in some embodiments, at least 3:1, or even at least 4:1).

In some embodiments, the first segments are spaced apart not more than 2 mm (in some embodiments, not more than 1 mm).

In some embodiments, the second segments have a height in a range from 0.1 to 5 (in some embodiments, in a range from 0.1 to 2, or even 0.1 to 1) mm. In some embodiments, the first protrusions have a height in a range from 0.05 to 2 (in some embodiments, in a range from 0.05 to 1, or even 0.05 to 0.5) mm. In some embodiments, the second protrusions have a height in a range from 0.05 to 2 (in some embodiments, in a range from 0.05 to 1, or even 0.05 to 0.5) mm.

In some embodiments, each of the second segments and first protrusions have a height and a ratio of second segment height to first protrusion height in a range from 10 to 1 (in some embodiments, in a range from 5 to 1, or even 2 to 1) mm. In some embodiments, each of the second segments and second protrusions have a height and a ratio of second segment height to second protrusion height in a range from 10 to 1 (in some embodiments, in a range from 5 to 1, or even 2 to 1) mm. In some embodiments each of the first and second protrusions have a height and a ratio of first protrusion height to second protrusion height in a range from 0.5 to 1 (in some embodiments, in a range from 1 to 1, or even 2 to 1) mm.

In some embodiments, there are at least 2.5 (in some embodiments, at least 5, 10, 15, 20, 25, 30, 35, or even up to 40) second segments per cm.

One exemplary use for articles described herein is as a coextruded polymeric adhesive article, wherein an adhesive is initially not exposed to contact to a substrate brought into proximity of the article, and can subsequently be exposed to contact to the substrate after mechanical movement of the second segment of the article, such as through hand-pressure in a shearing mode.

In some embodiments, polymeric materials used to make coextruded polymeric articles described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the art (e.g., to achieve desired color, tone, opacity, transmissivity, etc.). If desired, the polymeric materials may be formulated to have the same or different colors.

Another exemplary use for coextruded polymeric articles described herein is as a household cleaning product (e.g., a mop, a duster, a brush, a cleaning cloth, or a lint roller) whose effectiveness is increased by the movement inherent to its use.

Another exemplary use for coextruded polymeric articles described herein is as an adhesive article that can be adhesively attached to a substrate by slight shearing motion (e.g., a wall attachment which can be positioned without any adhesion), and subsequently adhered to the wall by gentle hand pressure accompanied by a slight shearing movement. The wall attachment can be subsequently removable by peeling. Another exemplary coextruded polymeric adhesive article has two levels of adhesiveness, which can be applied to a substrate at a low level of adhesiveness, repositioned as needed, and then subsequently be made to be highly adhesive by applying gentle hand pressure accompanied by a slight shearing movement. Yet another exemplary coextruded polymeric adhesive article has three levels of adhesiveness and two-sided adhesiveness. Such coextruded polymeric articles can behave as any described above, and then, on the still exposed surface (the surface opposing the surface already adhered to a substrate) can exhibit adhesiveness with respect to an additional substrate or article. For example, the coextruded polymeric article can be positioned against a wall, repositioned freely in a state of no or little adhesiveness. A gentle hand pressure can be applied accompanied with a slight shearing movement to provide a high level of adhesiveness. Then use of a third level of adhesiveness existing on the side of the coextruded polymeric adhesive article opposite the side adhered to the wall (which may be the same or different from either of the first two levels of adhesiveness) can be made to affix other objects to the wall such as posters, handbills, and other decorative materials, either permanently or removably, either once or repeatedly.

It is also within the scope of the present disclosure that properties in addition to adhesiveness can be triggered to exhibit tiered behavior in embodiments of coextruded polymeric articles described herein. For example, various chemical properties can also be utilized to provide channeling webs or tapes. An exemplary coextruded polymeric article could have hydrophobic projections and hydrophilic protrusions. Water, for instance, gently encountering such a coextruded polymeric article from the side having the projections would bead-up on the coextruded polymeric article, unless it approached with a determinate level of force or pressure, whereupon it would penetrate between projections deeply enough to encounter hydrophilic protrusions, and would be wicked down-channel due to hydrostatic forces, while still unable to penetrate through the layer to any appreciable extent.

EXEMPLARY EMBODIMENTS

1A. A coextruded polymeric article comprising:
 first segments each having first and second opposed major surfaces and a thickness, the first segments comprising first material;
 second segments comprising second material, wherein adjacent first segments are joined together via a second segment, wherein the second segments extend from the second major surface past the first major surface of each first adjacent segment and has a distal end, the second segments having first and second oppose sides;
 first protrusions each extending from the first side of a second segment and extending no more than to the first major surface of the respective first segment adjacent to the second segment, the first protrusions comprising third material; and
 second protrusions each extending from the first side of a second segment, contacting the first protrusion extending from the second segment and extending not more than to the distal end of the second segment, the second protrusions comprising fourth material,
 wherein at least one of the second and third or second and fourth materials are different, and wherein the first segments, second segments, first protrusions, and second protrusions each extend continuously for at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m).

2A. The coextruded polymeric article of Exemplary Embodiment 1A, wherein at least one of the third or fourth material is adhesive.

3A. The coextruded polymeric article of any preceding A Exemplary Embodiment, wherein at least one of the first, third or fourth materials is adhesive.

4A. The coextruded polymeric article of any preceding A Exemplary Embodiment, wherein the adhesive is at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

5A. The coextruded polymeric article of any preceding A Exemplary Embodiment, wherein there is a demarcation line between the first and second protrusions.

6A. The coextruded polymeric article of any preceding A Exemplary Embodiment, wherein there is a demarcation line between second segments and first protrusions.

7A. The coextruded polymeric article of any preceding A Exemplary Embodiment, wherein there is a demarcation line between second segments and second protrusions.

8A. The polymeric coextruded article of any preceding A Exemplary Embodiment, wherein there is a demarcation line between first and second segments.

9A. The coextruded polymeric article of any preceding A Exemplary Embodiment, wherein the second segments are generally parallel to each other and generally perpendicular to the first major surface of the adjacent first segments.

10A. The coextruded polymeric article of any preceding A Exemplary Embodiment, wherein the second segments have an aspect ratio (i.e., height to width) of at least 2:1 (in some embodiments, at least 3:1, or even at least 4:1).

11A. The coextruded polymeric article of any preceding A Exemplary Embodiment, wherein the first protrusions have an aspect ratio (i.e., height to width) of at least 2:1 (in some embodiments, at least 5:1, or even at least 10:1).

12A. The coextruded polymeric article of any preceding A Exemplary Embodiment, wherein the second protrusions have an aspect ratio (i.e., height to width) of at least 2:1 (in some embodiments, at least 5:1, or even at least 10:1).

13A. The coextruded polymeric article of any preceding A Exemplary Embodiment, wherein the first segments are spaced apart not more than 2 mm (in some embodiments, not more than 1 mm).

14A. The polymeric coextruded article of any preceding A Exemplary Embodiment, wherein at least two of the first, second, third, or fourth materials are the same material.

15A. The coextruded polymeric article of any preceding A Exemplary Embodiment, wherein at least two of the first, second, third, or fourth materials are different materials.

16A. The coextruded polymeric article of any preceding A Exemplary Embodiment, wherein the second segments have a height in a range from 0.1 to 5 (in some embodiments, in a range from 0.1 to 2, or even 0.1 to 1) mm.

17A. The coextruded polymeric article of any preceding A Exemplary Embodiment, wherein the second segments have a longest cross-sectional dimension in a range from 0.05 to 0.5 (in some embodiments, in a range from 0.05 to 0.2, or even 0.05 to 0.1) mm.

18A. The coextruded polymeric article of any preceding A Exemplary Embodiment, wherein the first protrusions have a height in a range from 0.05 to 2 (in some embodiments, in a range from 0.05 to 1, or even 0.05 to 0.5) mm.

19A. The coextruded polymeric article of any preceding A Exemplary Embodiment, wherein the first protrusions have a longest cross-sectional dimension in a range from 0.05 to 0.5 (in some embodiments, in a range from 0.05 to 0.2, or even 0.05 to 0.1) mm.

20A. The coextruded polymeric article of any preceding A Exemplary Embodiment, wherein the second protrusions have a height in a range from 0.05 to 2 (in some embodiments, in a range from 0.05 to 1, or even 0.05 to 0.5) mm.

21A. The coextruded polymeric article of any preceding A Exemplary Embodiment, wherein the second protrusions have a longest cross-sectional dimension in a range from 0.05 to 0.5 (in some embodiments, in a range from 0.05 to 0.2, or even 0.05 to 0.1) mm.

22A. The coextruded polymeric article of any preceding A Exemplary Embodiment, wherein each of the second segments and first protrusions have a height and a ratio of second segment height to first protrusion height in a range from 10 to 1 (in some embodiments, in a range from 5 to 1, or even 2 to 1) mm.

23A. The coextruded polymeric article of any preceding A Exemplary Embodiment, wherein each of the second segments and second protrusions have a height and a ratio of second segment height to fourth segment height in a range from 10 to 1 (in some embodiments, in a range from 5 to 1, or even 2 to 1) mm.

24A. The coextruded polymeric article of any preceding A Exemplary Embodiment, wherein each of the first and second protrusions have a height and a ratio of first protrusion height to second protrusion height in a range from 0.5 to 1 (in some embodiments, in a range from 1 to 1, or even 2 to 1) mm.

25A. The coextruded polymeric article of any preceding A Exemplary Embodiment having a distance between the first and second major surfaces of the first segments are in a range from 0.05 mm to 5 mm (in some embodiments, in a range from 0.05 mm to 3 mm, 0.05 mm to 2 mm, or even 0.1 mm to 1 mm).

26A. The coextruded polymeric article of any preceding A Exemplary Embodiment, wherein there are at least 2.5 (in some embodiments, at least 5, 10, 15, 20, 25, 30, 35, or even up to 40) second segments per cm.

1B. A method of making a coextruded polymeric article of any preceding A Exemplary Embodiment, the method comprising:

providing an extrusion die comprising a plurality of shims positioned adjacent to one another, the shims together defining a first cavity, a second cavity, a third cavity, a fourth cavity, and a die slot, wherein the die slot has a distal opening, wherein the die slot is comprised of a first plurality of orifices, a second plurality of orifices, a third plurality of orifices, and a fourth plurality of orifices, wherein the plurality of shims comprises a first plurality of a repeating sequence of shims that together provide a fluid passageway between the first cavity and a first orifice, a second plurality of a repeating sequence of shims that together provide a fluid passageway between the second cavity and a second orifice, a third plurality of a repeating sequence of shims that together provide a fluid passageway between the first cavity and a first orifice and also together provide a fluid passageway between the third cavity and a third orifice and also together provide a fluid passageway between the fourth cavity and a fourth orifice;

providing via extrusion a first material to the first cavity of the extrusion die, a second material to the second cavity of the extrusion die, a third material to the third cavity of the extrusion die, and a fourth material to fourth cavity of the die, wherein the second and third or second and fourth materials are different;

extruding a layer from the distal opening of the die slot; and quenching the extruded layer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Prophetic Example

A co-extrusion die as generally depicted in FIGS. 8 and 10 can be assembled with a multi shim repeating pattern of extrusion orifices as generally illustrated in FIG. 8. The thickness of the shims in the repeat sequence can be 4 mils (0.102 mm) for shims 400, 500, and 700 and 2 mils (0.51 mm) for shim 300, and 600. These shims can be formed from stainless steel, with perforations cut by a wire electron discharge machining. The shims can be stacked in a repeating sequence 300, 400, 400, 300, 400, 400, 300, 500, 500, 600, 700 and 700. The extrusion orifices can be aligned in a collinear, alternating arrangement. The total width of the shim setup can be about 12.5 cm (5 inches).

The inlet fittings on the two end blocks can be each connected to four conventional single-screw extruders. The extruders feeding the three cavities can be loaded with a thermoplastic polymer such as a polyethylene copolymer (available, for example, under the trade designation "ELVALOY 1609" from DuPont Company, Wilmington, DE). The thermoplastic polymer for the first cavity can be dry blended with a color concentrate such as a yellow color concentrate (available, for example, under the trade designation "10038103" from PolyOne Distribution, Romeoville, IL). The thermoplastic polymer for the second cavity can be dry blended with a second color concentrate such as a green color concentrate (available, for example, under the trade designation "PP64643536" from Clariant, Minneapolis, MN). The extruder feeding the third cavity can be dry blended with a third color concentrate such as a white color concentrate (available, for example, under the trade designation "PP1015100S" from Clariant). The extruder feeding the fourth cavity can be loaded with an adhesive such as an acrylate copolymer adhesive (available, for example, under the trade designation "R 55586" from 3M Company, St. Paul, MN).

The melt can be extruded vertically into an extrusion quench takeaway. The quench roll can be a smooth temperature controlled chrome plated 20 cm diameter steel roll or similar devise. The quench temperature can be controlled with internal water flow. The web path can be wrapped 180 degrees around a chrome steel roll and then to a windup roll.

Other process conditions are listed below:

| | |
|---|---|
| Flow rate of first polymer (first segment) | at least 1 kg/hr. |
| Flow rate of second polymer (second segment) | at least 1 kg/hr. |
| Flow rate of third polymer (first projection) | at least 0.5 kg/hr. |
| Flow rate of fourth polymer (second projection) | at least 0.5 kg/hr. |
| Extrusion temperature | 190° C. or higher or lower dependent upon pressures |
| Quench roll temperature | 10° C. or higher or lower |
| Quench takeaway speed | at least 1 m/min. |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A coextruded polymeric article comprising:
   first segments each having first and second opposed major surfaces and a thickness, the first segments comprising first material;
   second segments comprising second material, wherein adjacent first segments are joined together via a second segment, wherein the second segments extend from the second major surface past the first major surface of each first adjacent segment and has a distal end, the second segments having first and second oppose sides;
   first protrusions each extending from the first side of a second segment and extending no more than to the first major surface of the respective first segment adjacent to the second segment, the first protrusions comprising third material; and
   second protrusions each extending from the first side of a second segment, contacting the first protrusion extending from the second segment and extending not more than to the distal end of the second segment, the second protrusions comprising fourth material,
   wherein at least one of the second and third or second and fourth materials are different, and wherein the first segments, second segments, first protrusions, and second protrusions each extend continuously for at least 5 mm; and
   where in at least one of the third or fourth material is a first adhesive.

2. The coextruded polymeric article of claim 1, wherein of the third material is the first adhesive and the fourth material is a second adhesive.

3. The coextruded polymeric article of claim 1, wherein the first material is a third adhesive.

4. The coextruded polymeric article of claim 1, wherein the first adhesive is at least one of an acrylate copolymer pressure sensitive adhesive, a rubber-based adhesive, a silicone polyurea-based adhesive, a silicone polyoxamide-based adhesive, a polyurethane-based adhesive, or a poly(vinyl ethyl ether)-based adhesive.

5. The coextruded polymeric article of claim 1, wherein there is at least one of a demarcation line between at least one of first and second protrusions, second segments and second protrusions, second segments and first protrusions, or first and second segments.

6. The coextruded polymeric article of claim 1, wherein the second segments are generally parallel to each other and generally perpendicular to the first major surface of the adjacent first segments.

7. The coextruded polymeric article of claim 1, wherein at least one of the second segments, the first protrusions, or the second protrusions have an aspect ratio of at least 2:1.

8. The coextruded polymeric article of claim 1, wherein the first segments are spaced apart not more than 2 mm.

9. The coextruded polymeric article of claim 1, wherein at least two of the first, second, third, or fourth materials are the same material.

10. The coextruded polymeric article of claim 1, wherein at least two of the first, second, third, or fourth materials are different materials.

11. The coextruded polymeric article of claim 1, wherein the second segments have a height in a range from 0.1 to 5 mm, wherein the first protrusions have a height in a range from 0.05 to 2 mm, wherein the second protrusions have a height in a range from 0.05 to 2 mm.

12. The coextruded polymeric article of claim 1, wherein the second segments have a longest cross-sectional dimension in a range from 0.05 to 0.5 mm, wherein the first protrusions have a longest cross-sectional dimension in a range from 0.05 to 0.5 mm, and wherein the second protrusions have a longest cross-sectional dimension in a range from 0.05 to 0.5 mm.

13. The coextruded polymeric article of claim 1, wherein each of the second segments and first protrusions have a height and a ratio of second segment height to first protrusion height in a range from 10 to 1 mm, and wherein each of the second segments and second protrusions have a height and a ratio of second segment height to fourth segment height in a range from 10 to 1 mm.

14. The coextruded polymeric article of claim 1 having a distance between the first and second major surfaces of the first segments are in a range from 0.05 mm to 5 mm.

15. A method of making a coextruded polymeric article of claim 1, the method comprising:
   providing an extrusion die comprising a plurality of shims positioned adjacent to one another, the shims together defining a first cavity, a second cavity, a third cavity, a fourth cavity, and a die slot, wherein the die slot has a distal opening, wherein the die slot is comprised of a first plurality of orifices, a second plurality of orifices, a third plurality of orifices, and a fourth plurality of orifices, wherein the plurality of shims comprises a first plurality of a repeating sequence of shims that together provide a fluid passageway between the first cavity and a first orifice, a second plurality of a repeating sequence of shims that together provide a fluid passageway between the second cavity and a second orifice, a third plurality of a repeating sequence of shims that together provide a fluid passageway between the first cavity and a first orifice and also together provide a fluid passageway between the third cavity and a third orifice and also together provide a fluid passageway between the fourth cavity and a fourth orifice;
   providing via extrusion a first material to the first cavity of the extrusion die, a second material to the second cavity of the extrusion die, a third material to the third cavity of the extrusion die, and a fourth material to fourth cavity of the die, wherein the second and third or second and fourth materials are different;
   extruding a layer from the distal opening of the die slot; and
   quenching the extruded layer.

16. The coextruded polymeric article of claim 2, wherein the third and fourth materials are different, and the second adhesive is at least one of an acrylate copolymer pressure sensitive adhesive, a rubber-based adhesive, a silicone polyurea-based adhesive, a silicone polyoxamide-based adhesive, a polyurethane-based adhesive, or a poly(vinyl ethyl ether)-based adhesive.

* * * * *